United States Patent
Niijima et al.

(10) Patent No.: US 6,395,071 B1
(45) Date of Patent: May 28, 2002

(54) BREATHING FILM

(75) Inventors: Kentaro Niijima; Shinji Nakata; Yasuhiro Shiraishi; Takanori Nakashima, all of Chiba (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/671,512

(22) Filed: Sep. 27, 2000

(30) Foreign Application Priority Data

Oct. 1, 1999 (JP) .......................................... 11-281609

(51) Int. Cl.⁷ .......................... B01D 53/22; B32B 3/00; B32B 3/26
(52) U.S. Cl. ............... 96/6; 96/12; 428/315.8; 521/134
(58) Field of Search ................ 521/134; 96/6, 96/12; 428/315.9

(56) References Cited

U.S. PATENT DOCUMENTS

| | | | |
|---|---|---|---|
| 4,619,859 A | 10/1986 | Yoshimura et al. | |
| 5,134,174 A | 7/1992 | Xu et al. | 521/143 |
| 5,254,393 A | 10/1993 | Murschall et al. | |
| 5,298,561 A | 3/1994 | Cecchin et al. | |
| 5,744,205 A | 4/1998 | Kawai et al. | |
| 5,777,055 A | 7/1998 | Peiffer et al. | |
| 6,294,632 B1 | 9/2001 | Shiraishi et al. | |

FOREIGN PATENT DOCUMENTS

| | | |
|---|---|---|
| EP | 0 270 764 | 6/1988 |
| EP | 0 538 749 | 4/1993 |
| EP | 0 726 292 | 8/1996 |
| JP | 63-102634 | 5/1988 |
| JP | 1-171434 | 7/1989 |
| JP | 4-97843 | 3/1992 |
| JP | 4-296530 | 10/1992 |
| JP | 5-38792 | 2/1993 |
| JP | 5-168398 | 7/1993 |
| JP | 6-211996 | 8/1994 |
| JP | 7-17043 | 3/1995 |
| JP | 7-118429 | 5/1995 |
| JP | 7-241906 | 9/1995 |
| JP | 8-34103 | 2/1996 |
| JP | 8-119292 | 5/1996 |
| JP | 8-217930 | 8/1996 |
| JP | 9-169050 | 6/1997 |

OTHER PUBLICATIONS

Patent Coorperation Treaty (PCT) International Preliminary Examination Report of PCT/JP97/02533 (English Translation).
International Search Report of PCT/JP97/02533.
Supplementary European Search Report of 97 93 0867.
U.S. application No. 09/445,194, Gas Permeable Firm (Title).
U.S. application No. 09/670,273, Ando et al., filed Sep. 27, 2000.
U.S. application No. 09/670,273, Ando et al. (Pending Claims).

Primary Examiner—Morton Foelak
(74) Attorney, Agent, or Firm—Leydig, Voit, & Mayer, Ltd.

(57) ABSTRACT

A breathing film comprising at least one layer obtained by processing a propylene resin composition including crystalline propylene polymer(A) and propylene/α-olefin random copolymer(B) is provided, said film having anti-bacterial agent, and the ratio $[\eta]_B/[\eta]_A$ of intrinsic viscosity $[\eta]_B$ of propylene/α-olefin random copolymer(B) and intrinsic viscosity $[\eta]_A$ of crystalline propylene polymer(A) being 0.3 to 1.2, and said film having specified range of water vapor permeability, oxygen gas permeability and ethylene gas permeability.

9 Claims, No Drawings

BREATHING FILM

BACKGROUND OF THE INVENTION

(1) Field of the Invention

The present invention relates to a film having excellent capability of preserving freshness of contents. More specifically, it relates to a film preferably used for packaging fresh produce, having good anti-bacterial performance and proper degree of permeability for each gases: mainly water vapor, oxygen and ethylene.

(2) Description of the Related Art

Recently plastic films are widely used for packaging food, textiles and others. Especially, among polyolefin films, polypropylene film drawn at least in one direction (hereafter sometimes referred to as "drawn PP film") is used for many ways as a packaging material because of excellent transparency, and further, providing good printability, bag making processability and filling workability due to its high mechanical strength.

A drawn PP film, in general, tends to become less permeable to gases such as water vapor and oxygen because its density goes higher as the order of molecular orientation increases by drawing. Consequently, when an item like fresh produce is packaged by such a film, its freshness goes worse because of insufficient supply of oxygen to the packaged produce from the outside of the packaging material. Also it often occurs that the packaged fresh produce rot through propagation of microbes existing in air or attached to the packaged item like fresh produce thus losing commercial value.

Also it is said that fresh produce lose its commercial value typically if more than 5% of contained water is exhaled.

Therefore it is also necessary to suppress the amount of water vaporizing outwards through the packaging material from the packaged fresh produce.

However, on the other hand, over humidification or dewing inside the package can be another cause of rotting of packaged fresh produce.

Additionally a film used for packaging material of fresh produce with low permeability of ethylene gas results in such a problem that it accelerates over-ripening or rotting of the fresh produce due to accumulation of ethylene gas generated by the fresh produce themselves.

Currently drawn PP films circulating as the packaging material for fresh produce are actually unable to properly adjust the amount of water vapor permeation from inside to outside of the packaging material but inhibiting dew formation by incorporating a anti-fogging agent into the film, or unable to properly adjust the permeating amount of gases such as water vapor, oxygen and carbon dioxide but physically perforated through the film in the course of packaging fresh procedure to supplement gas permeability.

SUMMARY OF THE INVENTION

The present invention is a breathing film which contains at least one layer obtained by processing a propylene resin composition comprising crystalline propylene polymer(A) and propylene/α-olefin random copolymer(B) having 45 to 85% by weight of propylene unit based on the weight of copolymer(B); a film having anti-bacterial agent coated thereon or included therein; in which said composition comprises 10 to 60% by weight of propylene/α-olefin random copolymer(B) based on the total weight of polymer(A) and copolymer(B) and the ratio $[\eta]_B/[\eta]_A$ of intrinsic viscosity $[\eta]_B$ of propylene/α-olefin random copolymer(B) and intrinsic viscosity $[\eta]_A$ of crystalline propylene polymer(A) being 0.3 to 1.2; and (1) water vapor permeability $[T_{H2O}]$ (according to JIS Z 0208), (2) oxygen gas permeability $[T_{O2}]$ (according to JIS K 7126-A), and (3) ethylene gas permeability $[T_{ethylene}]$ (according to JIS K 7126-A) are each in the range described below.

(1) $[T_{H2O}]$=9 to 50 (unit:g/m$^2$·24 h)
(2) $[T_{O2}]$=600 to 12500 (unit:nmol/m$^2$·s·100 kPa)
(3) $[T_{ethylene}]$=600 to 22500 (unit:nmol/m$^2$·s·100 kPa)

DESCRIPTION OF PREFERRED EMBODIMENTS

One object of the present invention is to provide a film capable of properly adjusting the permeability of gases influencing the freshness of packaged items when used for packaging material and especially to provide a film suitable as the packaging material for fresh produce.

Also another object is to provide a film capable of properly adjusting the permeability of gases influencing the freshness of packaged items when used for packaging material together with having anti-bacterial performance and especially to provide a film suitable as the packaging material for fresh produce.

Furthermore, another object is to provide a film capable of adjusting the permeability of water vapor, oxygen and ethylene gas each to a level properly preserving freshness of packaged items without perforating process conventionally performed when used for packaging material and capable of maintaining good transparency, gloss and mechanical strength originally possessed by PP film and to provide a film suitable especially for packaging material for fresh produce.

The present inventors, after enthusiastic efforts of study to achieve the above-mentioned objects, found out that a film using specific propylene resin composition and having anti-bacterial agent coated thereon or included therein has good gas permeability and anti-bacterial performance and is preferable especially as a film for packaging fresh produce and completed the present invention.

The breathing film of the present invention has water vapor permeability of 9 to 50 g/m$^2$·24 h, preferably in the range of 10 to 45 g/m$^2$·24 h. When water vapor permeability of the film is lower than 9 g/m$^2$·24 h, rotting of fresh produce is apt to be accelerated due to over humidity if used this film as a packaging material for such fresh produce. On the other hand, when said water vapor permeability exceeds 50 g/m$^2$·24 h, fresh produce especially vegetables are apt to be dried up to death.

Oxygen permeability of the breathing film of the present invention is 600 to 12500 nmol/m$^2$·s·100 kPa, preferably in the range of 1000 to 9000 nmol/m$^2$·s·100 kPa. When oxygen permeability of the film is lower than 600 nmol/m$^2$·s·100 kPa, respiration level of fresh produce decreases due to insufficient supply of oxygen to the packaged fresh produce from outside of packaging and the fresh produce are apt to lose freshness. On the other hand, when said oxygen permeability exceeds 12500 nmol/m$^2$·s·100 kPa, increase of water vapor permeability is accompanied up to the undesirable level.

Ethylene gas permeability of the breathing film of the present invention is 600 to 22500 nmol/m$^2$·s·100 kPa, preferably in the range of 600 to 15000 nmol/m$^2$·s·100 kPa. When ethylene permeability is lower than 600 nmol/m$^2$·s·100 kPa, over-ripening or rotting of fresh produce is likely to be accelerated. On the other hand, ethylene gas permeability exceeds 22500 nmol/m$^2$·s·100 kPa, water vapor permeability is accompanied up to the undesirable level.

Thickness of the breathing film of the present invention is preferably in the range of 10 to 100 μm from the viewpoint of film making processability, workability (packaging fitness) and so on. When film thickness is thinner than 10 μm, it is difficult to make film of uniform thickness. When film thickness is heavier than 100 μm, gas permeability lowers.

Also the breathing film of the present invention has anti-bacterial agent coated thereon or included therein. When the anti-bacterial agent is included in the film, it is preferable for the anti-bacterial agent to exist near the surface of film from the point of efficient anti-bacterial action. When film thickness is heavier than 100 μm, concentration of anti-bacterial agent existing near the surface of film lowers.

Therefore film thickness is preferably in the range of 15 to 70 μm because of good preservation of freshness of fresh produce and elevated efficiency of anti-bacterial action.

The crystalline propylene polymer(A) constituting propylene resin composition used in the present invention is preferably homopolymer of propylene or propylene/α-olefin random copolymer having higher than 90% by weight of propylene unit based on the weight of the copolymer. Especially preferable is a random copolymer of propylene and α-olefin except propylene having propylene unit in the range of 99.1 to 99.9% by weight based on the weight of the copolymer which is suitable for applications requiring secondary processing such as multi-color printing and extrusion laminating. When content of propylene unit is low, heat resistance of the obtained film lowers.

In case that the crystalline propylene polymer(A) is a propylene/α-olefin random copolymer, ethylene, 1-butene, 1-pentene, 1-hexene, 1-octene, 1-decene, 1-dodecene, 4-methyl1-pentene, 3-methyl-l-pentene and so on can be illustrated as α-olefin components of which one or more than two can be employed. Among these, ethylene, 1-butene or mixture thereof is preferably used from the point of manufacturing cost.

The propylene/α-olefin random copolymer(B) constituting the propylene resin composition used in the present invention is a random copolymer of propylene and α-olefin except propylene having propylene unit in the range of 45 to 85% by weight based on the weight of the copolymer. When propylene unit content is low, transparency of the obtained film lowers and, when it is high, on the other hand, gas permeability becomes insufficient. Specifically, the propylene/α-olefin random copolymer(B) contains propylene unit preferably in the range of 60 to 83% by weight based on the weight of the copolymer. As the α-olefin component constituting propylene/α-olefin random copolymer(B), the same as the α-olefin component constituting before-mentioned copolymer(A) can be illustrated. Specifically ethylene, 1-butene or mixture thereof is preferably used.

The propylene/α-olefin random copolymer(B) constituting the propylene resin composition used in the present invention preferably has an intrinsic viscosity $[\eta]_B$ measured in tetralin at 135° C. of 0.5 to 2.0 dL/g, more preferably 1.0 to 2.0 dL/g. The intrinsic viscosity $[\eta]_B$ of the propylene/α-olefin random copolymer(B) has an effect on stiffness and transparency of film. The larger the intrinsicviscosity $[\eta]_B$ of the propylene/α-olefin random copolymer(B), the poorer the transparency of film and in case it is too small, stiffness of film lowers.

Further the propylene/α-olefin random copolymer(B) contains xylene-soluble component at 20° C. preferably more than 80% by weight, more preferably more than 85% by weight based on the weight of copolymer(B).

In the propylene resin composition used in the present invention, the ratio $[\eta]_B/[\eta]_A$ of intrinsic viscosity$[\eta]_B$ of propylene/α-olefin random copolymer(B) and intrinsic viscosity $[\eta]_A$ of crystalline propylene polymer(A) is in the range of 0.3 to 1.2, preferably 0.5 to 1.0. Said ratio $[\eta]_B/[\eta]_A$ of intrinsic viscosity has an effect on the degree of dispersion of propylene/α-olefin random copolymer(B) in the crystalline propylene polymer(A). When said ratio $[\eta]_B/[\eta]_A$ of intrinsic viscosity is too large, film transparency lowers and when it is too small, film stiffness lowers so that the intended balance of properties can not achieved in both cases.

Also the intrinsic viscosity of the propylene resin composition used in the present invention is preferably in the range of 1.6 to 3.6 dL/g, more preferably 1.8 to 2.5 dL/g from the point of film making processability.

The propylene resin composition of the present invention contains propylene/α-olefin random copolymer(B) in the range of 10 to 60% by weight, preferably 15 to 50% by weight based on the total weight of said copolymer(B) and crystalline propylene polymer(A).

The film obtained by using the propylene resin composition fulfilling provisions designated in the present invention has excellent film stiffness and melt-cut seal strength and so on even for single layer construction. Also it is possible to control gas permeability of the of the film by adjusting the content of propylene/α-olefin random copolymer(B) in the propylene resin composition and further by adjusting the rate of drawing of the film. From the above-mentioned reasons, the film of the present invention shows most preferable characteristics for the packaging of fresh produce.

In order to afford gas permeability to polyolefin films, it has been proposed that a chemical species having polar group or the like is incorporated as a component of the composition constituting the film. How ever it maybe an obstacle for recycling said film by cutting for the raw material of polyolefin that such different component is added to polyolefin film. Also in case of using said film as a layer component of the laminated film, some restriction on the lamination design may take place such as requiring to select a film comprising a component compatible with the chemical species having said polar group or the like. The film of the present invention needs no such different component and, even in a single layer film, exhibits excellent suitability as the packaging film for fresh produce thus being of great industrial importance.

The anti-bacterial agent to be used for the breathing film of the present invention is not specifically limited to if a chemical compound has merely anti-bacterial ability but preferably selected from the group of anti-bacterial zeolite or far infrared radiating ceramics or ε-polylysine, or natural components such as chitosan, hinokitiol or catechin. Also the anti-bacterial agent to be used for the breathing film of the present invention has preferably such a degree of particle size that passes 100 mesh sieve (150 μm stitch) defined in JIS Z 8801 (Testing Sieve) equal to or more than 80% by weight. More preferably the anti-bacterial agent has a degree of particle size of passing 100 mesh sieve (150 μm stitch) equal to or more than 90% by weight. And most preferable anti-bacterial agent has a degree of particle size of passing 200 mesh sieve (75 μm stitch) equal to or more than 80% by weight.

The breathing film of the present invention is a film containing at least one layer obtained by processing a propylene resin composition comprising crystalline propylene polymer(A) and propylene/α-olefin random copolymer (B) having 45 to 85% by weight of propylene unit based on the weight of copolymer(B). And the breathing film of the present invention has anti-bacterial agent coated thereon or included therein. When a breathing film is a single layer film, the film has anti-bacterial agent coated thereon in the range of 0.01 to 300 mg per $m^2$ of the film or included therein in the range of 0.05 to 30% by weight based on the weight of the film. On the other hand, when a breathing film is a multi-layer film, the film has anti-bacterial agent coated on at least the surface layer in the range of 0.01 to 300 mg per $m^2$ of the surface layer or included in at least the surface layer in the range of 0.05 to 30% by weight based on the weight of the surface layer.

The content of said anti-bacterial agent included in the single-layer film or in the surface layer of the multi-layer film is preferably in the range of 0.1 to 10% by weight based on the film or the layer. When the content of anti-bacterial agent included in the film or the layer is lower than 0.05% by weight, the effect of preserving freshness can not be achieved sufficiently and when the content exceeds 30% by weight, anti-bacterial agent does not uniformly disperse remaining in biased deposition and causing poor appearance of film although the anti-bacterial effect remains saturated.

The amount of anti-bacterial agent coated on the film or the layer is preferably in the range of 0.5 to 100 mg per $m^2$ of the film or the layer.

The process to include anti-bacterial agent into the film is not specifically limited to. The breathing film of the present invention can be made by mixing said propylene resin composition with anti-bacterial agent followed by film making of said mixture when the film is single layer.

Also when the breathing film of the present invention is multi-layer, anti-bacterial efficiency is improved if anti-bacterial agent exists at higher concentration in surface layer of the film. Therefore said multi-layer film can be made preferably by processing the mixture of said propylene resin composition and anti-bacterial agent to form surface layer followed by laminating this layer to a film obtained by processing a composition except said propylene resin composition or can be made by processing the mixture of a composition except the propylene resin composition used in the present invention with anti-bacterial agent into surface layer and laminating this to a film obtained by processing the propylene resin composition used in the present invention. As anti-bacterial agent is generally expensive, it is economical to include anti-bacterial agent only in the surface layer of the multi-layer film.

The process to coat anti-bacterial agent onto the film is also not specifically limited to. Anti-bacterial agent can be coated on the film by carrying out a known procedure such as spray coating method, roll coating method or dip coating method.

The breathing film of the present invention is preferably a film drawn at least in one direction from the point of film strength. As for the drawing process, successive biaxial stretching by tenter method of a sheet made by T-die method or simultaneous biaxial stretching by tubular method of a sheet made by blown method can be illustrated. Draw ratio is preferably 3 to 60 times from the point of keeping film transparency, strength and gas permeation level. When draw ratio is lower than 3 times, film thickness may be uneven and when exceeding 60 times, it may be difficult even to form such film. Preferable draw ratio is 10 to 60 times, more preferably 20 to 50 times.

Usually polypropylene film is used as drawn to afford film strength and, further, straight cut ability required for packaging materials. As the result of drawing, polypropylene film has tendency of increasing film density due to increasing regularity of molecular orientation resulting in increasing barrier to gas permeation of water vapor or oxygen. However the film obtained from the propylene resin composition used preferably in the present invention has a feature that the decrease of gas permeation behavior is small after drawing. In addition, the breathing film of the present invention has excellent transparency and see-through level and advantageously used for heavy gauge packaging film necessary to be designed corresponding requirement of application conditions.

In case that the breathing film of the present invention is multi-layered, it is preferable that the layer using the propylene resin composition defined in the present invention occupies more than 50% thickness based on total thickness of the multi-layer film from the point of keeping proper permeating level of gases. When the thickness is less than 50%, permeation level of gases may be short. In said multi-layer film, a layer constituting the multi-layer film of the present invention other than the layer obtained by processing the propylene resin composition used in the present invention can be illustrated as a layer obtained by processing PP, LLDPE or EVA As for the manufacturing method of said multi-layer film, though not specifically limited to, multi-layer extrusion method, dry lamination method, extrusion lamination method and so on can be illustrated.

The propylene resin composition used in the present invention can be made using any process provided satisfying above-mentioned conditions, however, can be preferably made by adopting multi-stage continuous polymerization process. This multi-stage continuous polymerization process is performed in gas phase under the existence of olefin polymerization catalyst and in the first stage polymerization the propylene and olefin except propylene are copolymerized to form crystalline propylene polymer(A) of specified quantity and specified composition and in the second stage polymerization, the propylene and olefin except propylene are copolymerized at different ratio of composition to form propylene/α-olefin random copolymer(B) in this order and continuously. In such multi-stage continuous polymerization process, each weight % content of crystalline propylene polymer(A) and propylene/α-olefin random copolymer(B) based on the total weight of polymer(A) and copolymer(B) ($W_A$, $W_B$) can be calculated according to the following formulae (1) to (4) for example by paying attention to the elements constituting catalyst. The following is an example of calculation in case that the catalyst contains Mg as a constitution element.

(1) $CY_A$(g-powder/g-catalyst)=10000×Mg content in the catalyst(wt %)/Mg content (wt ppm) in powder sampled after the first polymerization step (2) $C_{WHOLE}$(g-powder/g-catalyst)=10000×Mg content in the catalyst(wt %)/Mg content (wt ppm) in powder sampled after the final step (3) $W_B=(C_{WHOLE}-CY_A)/CY_{WHOLE}$ (4) $W_A=1-W_B$ Also the intrinsic viscosity of propylene/α-olefin random Copolymer(B) $[\eta]_B$ can be calculated by the following formula (5) using the intrinsic viscosity of crystalline propylene polymer(A) $[\eta]_A$, the intrinsic viscosity of the final product propylene resin composition $[\eta]W_{HOLE}$ both of which can be directly measured and the weight % of propylene/α-olefin random copolymer(B) ($W_B$).

(5) $[\eta]_B = \{[\eta]_{WHOLE} - (1-W_B/100) [\eta]_A\}$

Further, weight % of xylene soluble fraction of propylene/α-olefin random copolymer(B) at 20° C. ($CXS_B$) can be calculated by the following formula (6) using weight % of xylene soluble fraction of crystalline propylene polymer(A) at 20° C. ($CXS_A$), weight % of xylene soluble fraction of propylene resin composition ($CXS_{WHOLE}$) at 20° C. and weight % of propylene/α-olefin random copolymer(B) ($W_B$).

(6) $CXS_B = \{CXS_{WHOLE} - (1-W_B/100) CXS_A\}/(W_B/100)$

The olefin polymerizing catalyst used in the above manufacturing method is not specifically limited to but a known catalyst such as titanium-based catalyst and metallocene catalyst can be used. Among these, titanium-based catalyst is preferable from the point of cost.

In the propylene resin composition used in the present invention, known additives such as antioxidant, anti-blocking agent, anti-fogging agent or surface active agent can be incorporated to the extent not affecting the effect of the present invention. The method of incorporating the above additives in the propylene resin composition can be any process which can mix these uniformly, however, it is preferable to mix these by ribbon blender or Henschel Mixer (trade name) followed by melt compounding the resulted mixture.

Traditionally, to use a film as the packaging material of fresh produce, it was necessary to perforate the film in order to permeate gas because of insufficient gas permeation of the film. However though such film can sufficiently give out ethylene gas generated from the contents and take in oxygen gas necessary for respiration of fresh produce, exhalation of water vapor from fresh produce takes place simultaneously causing a problem that the fresh produce becomes dry and loses freshness. Further a serious problem was rotting of fresh produce caused by bacteria invaded through said perforated holes. Furthermore another problem was that such film is apt to be torn starting from said holes. Contrary to these, the breathing film of the present invention can sufficiently perform to take in oxygen gas and give out ethylene gas without perforating holes and can also properly suppress the exhalation of water vapor keeping freshness of fresh produce for a long time in cooperation with the effect of anti-bacterial agent.

The film of the present invention is a film providing gas permeability and anti-bacterial property preferable for the packaging of fresh produce in which the gas permeation level and a mechanical property (stiffness) and a optical property (transparency) can be controlled principally by adjusting the content of propylene/α-olefin random copolymer(B) within the used propylene resin composition which is a copolymer of propylene and α-olefin except propylene.

Also the breathing film of the present invention brings high productivity and profitability through the omission of physical perforation step traditionally performed.

In this specification, "fresh produce" means vegetables, root vegetables, fruits, flowers and mushrooms. And the followings can be illustrated as the fresh produce suit able to be packaged using the film of the present invention. For example, artichoke, asagi (a variation of Welsh onion), red bean, asparagus, avocado, aloe, apricot, strawberry, fig, iyokan (a variation of Japanese orange), udo (*Aralia cordata* Thumb.), plum, echallot, green soybean, enokitake (*Flammulina velutipes* Sing.), okura (*Hibiscus esculentus* L.), olive, orange, radish seedlings (kaiwaredaikon), persimon, turnip, pumpkin, cauliflower, kiwi fruit, chrysanthemum, kikurage (a fungus, *Auricularia auriculjudae* Quel.), cabbage, cucumber, cumquat, ginkgonut, chestnut, green peas, walnut, grape fruit, water cress, gogyou, cowberry, burdock, komatsuna (*Brassia rapa*), coriander, cherry, pomegranate fruit, sweet potato, taro, shaddok, kidney bean, field peas, lettuce, shiitake (a fungus, *Lentinus edodes* Sing.), beafsteak plant, shimeji (a fungus, *Pleurotus ostreatus*), potato, changtsai, garland, small ginger (*Gin iber officinale* Rosc.), water melon, sweety, garden radish (suzushiro), turnip (suzuna), star fruit, zucchini, plum, Japanese parsley, celery, osmund, broad bean (soramame), tahsai, radish, soy bean, red pepper, bamboo shoot, onion, taranome (*Aralia elata* Seem.), chingensai, horsetail, tekopon, wax gourd, corn, tomato, durian, truffle, Chinese yam, naganegi (a variation of Welsh onion), egg plant, shepherd's purse (nazuna), Watson pomelo, rape blossoms, nameko (a fungus, *Flammulina velutires* Sing.), nagauri (a variation of cucumber), Japanese pear, leek, carrot, garlic, pineapple, Chinese cabbage, chickweed, parsley, hassaku (a variation of Japanese orange), banana, papaya, banpeiyu (a variation of Japanese orange), pimento (green pepper), loquat, coltsfoot, the flower of coltsfoot, fukurotake (a fungus, *Volvariella volvacae*), grape, plum, blueberry, prune, broccoli, spinach, hotokenoza (*Lamium amplexicaule* L.), shaddock (ponkan), maitake (a fungus, *Grifola frondosa* S.F.Gray),muscat (avariation of grape), mushroom, matsutake, mango, mangosteen, Japanese orange, trefoil, myouga (*Gingiber Mio* Rosc.)melon, peach, bean sprouts, mulukhiya, yamatoimo (*Colocasia anticuorum Schott var. esculenta* Engl.), citron, pear, mugwort, raichi, raspberry, radish, apple, lettuce, lemon, lotus root, wakegi (a variation of Welsh onion), horse-radish, etc. are illustrated.

EXAMPLES

Followings are concrete explanation of the present invention through examples and comparative example. However, the present invention should not be limited thereto.

Methods for the measurement of physical properties and standards of evaluation indicated in Examples and Comparative Examples are as follows.

(1) Transparency: Haze value (unit: %)

This was measured according to the method described in ASTM D 1003. Smaller values indicate better transparency.

(2) Glossiness: Gloss value (unit: %)

This was measured according to the method described in ASTM D 523. Larger values indicate higher gloss.

(3) Stiffness: Young's modulus (unit: Mpa)

This was measured according to the method described in ASTM D 882. Larger values indicate film having higher stiffness.

(4) Permeation of water vapor: $T_{H2O}$ (unit: g/m$^2$/24 h)

This was measured according to the method described in JIS Z-0208 under the conditions of 40° C. temperature and 90% relative humidity.

(5) Permeability of oxygen: $T_{O2}$ (unit: nmol/m$^2$·s·100 kPa)

This was measured according to the method described in JIS K-7126A.

(6) Permeability of ethylene gas: $T_{ethylene}$ (unit: nmol/m$^2$·s·100 kPa)

This was measured according to the method described in JIS K-7126A.

(7) Intrinsic viscosity (unit: dL/g)

Tetralin (tetrahydronaphthalene) was used as a solvent and measurement was performed at a temperature of 135° C.

using an automatic viscosity measuring apparatus (AVS2 type, manufactured by Mitsui Toatsu Co., Ltd.)

(8) Amount of 20° C. xylene-soluble component (unit: % by weight)

This was measured according to the method described in ISO/DIS 1873-1.

(9) α-olefin unit content (unit: % by weight)

This was measured by infrared absorption spectrometry.

Polymer characteristics of various propylene resin compositions used in Examples and Comparative Examples (PP-1~-PP-3) are shown below. [PP-1]: This is a propylene resin composition comprising propylene/α-olefin copolymer (A) and propylene/α-olefin copolymer(B). Propylene/α-olefin copolymer(A) has ethylene as the α-olefin component, contains 99.8% by weight of propylene unit based on the weight of copolymer(A) and has an intrinsic viscosity of 2.23 dL/g. Propylene/α-olefin copolymer(B) has ethylene as the α-olefin component and contains 54% by weight of propylene unit based on the weight of copolymer (B). Also copolymer(B) has an intrinsic viscosity of 1.49 dL/g and an amount of 20° C. xylene-soluble component of 95% by weight; and its content in the composition ($W_B$) is 31% by weight. The intrinsic viscosity of the propylene resin composition is 2.00 dL/g. [PP-2]: This is a propylene homopolymer having an intrinsic viscosity of 2.09 dL/g. [PP-3]: This is an ethylene/propylene/1-butene random copolymer having a intrinsic viscosity of 1.83 dl/g, and an crystalline melting point of 125° C.

PP-1 used in Example 1 was produced as follows.

<1> Preparation of Titanium-containing solid catalyst (α)

In a stainless steel autoclave substituted inside air with nitrogen, 953 g of anhydrous $MgCl_2$ and 3.52 L of dry EtOH were added and the mixture was heated to 105° C. with stirring to be dissolved in a solution. After 1 hour stirring, the solution was sprayed into a spray tower through a 2-fluid spray nozzle with pressurized nitrogen (1.1 MPa) heated at 105° C. The flow rate of the nitrogen gas was 38 L/min. The inside of the spray tower was maintained at −15° C. by introduction of liquid nitrogen. The powder collected in cold hexane introduced to the bottom of the tower had a composition of $MgCl_2·EtOH$.

The obtained powder was sifted to obtain 2,180 g of spherical carrier having a particle diameter of 45 to 212 μm. The obtained carrier was dried by blowing nitrogen at a flow rate of 30 L/min at room temperature for 200 hours to obtain a dry carrier having a composition of $MgCl_2·EtOH$.

In a stainless steel reactor, 4.8 L of purified 1,2-dichloroethane, 400 g of dry carrier and 3.2 L of titanium tetrachloride were added, and the mixture was heated at 100° C. with stirring. Thereafter, 0.136 L of di-i-butyl phthalate was added and the mixture was heated at 100° C. for additional 2 hours followed by hot filtration to remove the liquid portion. To the residual solid, again 6.4 L of purified 1,2-dichloroethane and 3.2 L of titanium tetrachloride were added, and the mixture was heated at 100° C. for 1 hour followed by hot filtration to remove the liquid portion. The obtained solid was repeatedly washed with purified hexane until no free titanium was detected in washing liquid and dried to obtain a titanium-containing solid catalyst(α) having an average particle diameter of 115 μm and containing 1.6% by weight of titanium.

<2> Preliminary Polymerization Using Titanium-containing Solid Catalyst (α)

In a stainless steel reactor equipped with a tilted blade agitator (inside volume 20 L), after substituting the inside air with nitrogen gas, 1.7 L of saturated hydrocarbon solvent having a kinetic viscosity of 7.3 cSt at 40° C. (CRYSTOL-52 manufactured by ESSO Petroleum Co., Ltd.), 16 Lofn-hexane, 129 mmol of triethyl aluminum, 19 mmol of di-i-propyl dimethoxysilane and 140 g of titanium-containing solid catalyst(α) prepared as described in <1> were added at room temperature, and the mixture was heated to 30° C. to react with 280 g of propylene fed during 7 hours to perform preliminary polymerization. As a result of analysis, it was found that 1.8 g of polypropylene per 1 g of titanium-containing solid catalyst(α) was produced.

<3> The First Polymerization Step

In a horizontal reactor equipped with an agitator (L/D=6, inside volume 100 L), the titanium-containing solid catalyst treated for preliminary polymerization as described in<2> at a rate of 0.4 g/h, triethyl aluminum as an organic aluminum compound and di-i-propyl dimethoxysilane as an organic silicon compound each at a rate so that Al/Mg ratio is 6 and Al/Si ratio is 6 respectively were fed continuously. A mixed gas of ethylene and propylene was continuously fed maintaining conditions of 60° C. reaction temperature, 2.1 Mpa reaction pressure and 35 rpm stirring speed. Further ethylene/propylene mol ratio in gas phase of the reactor was adjusted at 0.002, and hydrogen/propylene mol ratio was adjusted at 0.008 during polymerization to obtain propylene/ethylene random copolymer(A).

The obtained propylene/ethylene random copolymer(A) was continuously extracted from the reactor of the first polymerization step so that the holding level of polymer is kept at 50% by volume based on the volume of the reactor and fed into the reactor of the second polymerization step. Here a portion of propylene/ethylene random copolymer(A) was intermittently sampled for measuring ethylene unit content, intrinsic viscosity $[\eta]_A$ and polymer yield per unit weight of catalyst. Polymer yield per unit weight of catalyst was measured via Mg component of polymer by inductively coupled plasma spectrometry (ICP method).

<4> The Second Polymerization Step

In a horizontal reactor equipped with an agitator (L/D=6, inside volume 100 L), propylene/ethylene random copolymer(A) extracted from the first polymerization step and a mixed gas of ethylene and propylene were continuously supplied to perform copolymerization of ethylene and propylene. Reaction conditions were stirring rate of 25 rpm, temperature of 55° C. and pressure of 1.9 MPa; and compositions in gas phase were adjusted to 0.33 mol ratio for ethylene/propylene and 0.54 mol ratio for hydrogen/ethylene. To control polymerization yield of resulted propylene/ethylene random copolymer(B), carbon monoxide as polymerization activity suppressor was supplied and to control the molecular weight of propylene/ethylene random copolymer(B) hydrogen gas was supplied.

The propylene resin composition obtained after the second polymerization step was continuously extracted from the reactor so that the holding level of polymer is kept at 50% by volume based on the volume of the reactor. Production rate of the propylene resin composition was 8 to 15 kg/h. Extracted propylene resin composition was removed of unreacted monomer and a portion thereof was used for measurement of intrinsic viscosity $[\eta]_{WHOLE}$ and analysis of Mg content in the composition by ICP method to calculate the content of propylene/ethylene random copolymer(B) ($W_B$).

Examples 1~4, Comparative Examples 1~2

<Production of film>

To each 99.4% by weight of PP-1~PP-3 based on the weight of composition obtained by blending, 0.50% by weight of tetrakis-[methylene-3-(3',5'-di-t-butyl-4'-hydroxyphenyl) propionate]methane as an antioxidant and 0.10% by weight of calcium stearate were blended and mixed uniformly by Henschel Mixer(trade name). The obtained mixture was melt-kneaded by extruder to result in Composition-1~Composition-3 in pellet form.

Also to each 98.4% by weight of PP-1 and PP-3 based on the weight of composition obtained by blending, 0.50% by weight of tetrakis-[methylene-3-(3',5'-di-t-butyl-4'-hydroxy phenyl) propionate] methane as an antioxidant and 0.10% by weight of calcium stearate were blended and further added 1.0% by weight of anti-bacterial zeolite which passes 100 mesh sieve by 99% by weight and 200 mesh sieve by 98% by weight both measured according to JIS Z-8801. This was uniformly mixed by Henschel Mixer (trade name) and the obtained mixture was melt-kneaded by extruder to result in Composition-4 and Composition-5 respectively in pellet form.

Also to each 98.4% by weight of PP-1 and PP-3 based on the weight of composition obtained by blending, 0.5% by weight of tetrakis-[methylene-3-(3',5'-di-t-butyl-4'-hydroxy phenyl)propionate]methane as an antioxidant and 0.10% by weight of calcium stearate were blended and further added 1.0% by weight of catechin which passes 100 mesh sieve by 99% by weight and 200 mesh sieve by 98% by weight both measured according to JIS Z-8801. This was uniformly mixed by Henschel Mixer (trade name) and the obtained mixture was melt-kneaded by extruder resulting in Composition-6 and Composition-7 respectively in pellet form.

Each composition obtained was used as the raw material of substrate layer or surface layer according to the combination indicated in Table-1. The raw material for substrate layer was fed to extruder having 90 mm diameter and the raw material for surface layer was fed to extruder having 40 mm diameter. Both were coextruded through T-die at 240° C. melt temperature, cooled on chill roll at 40° C., and a multi-layer sheet composed of two materials and two layers consisting of 700 μm substrate layer and 70 μm surface layer was obtained.

Then said sheet was biaxially drawn successively using pantograph type biaxial stretching test machine to obtain biaxially stretched film shown in Table-1. In Example 1 and Example 2, sheet was preheated at 156° C. for 120 seconds and then successively stretched longitudinally by 4.2 times and transversely by 8.2 times at stretching rate of 10 m/min. Also in Comparative Example 1 and Comparative Example 2, sheet was preheated at 160° C. for 120 seconds and then successively stretched longitudinally by 4.2 times and transversely by 8.2 times. From each film obtained as above, specified test pieces were prepared and measured of transparency, stiffness and each gas permeation according to specified testing methods. Results are shown in Table 1.

Using each film, side sealed bags of 20×20 cm size were made by melt-cutting so that the surface layer composition be the inside of the bag. 50 g of mushroom was packaged in each bag and stored at 10° C. temperature and 50% relative humidity. Observed results in the course of storage are shown in Table 2.

Similarly, using each film, side sealed bags of 20×30 cm size were made by melt-cutting. 100 g of trefoil was packaged in each bag and stored at 10° C. and 50% relative humidity. Observed results in the course of storage are shown in Table 3.

From the data shown in Table 2 and Table 3, it is clear that freshness of the fresh produce packaged in bags using films of the present invention (Example 1~4) which have better gas permeability has been preserved longer than in the conventional polypropylene packaging film (Comparative Example 1 and 2).

The breathing film of the present invention brings an effect to preserve freshness of the fresh produce for a long time by properly suppressing exhalation of water vapor in addition to keeping sufficient intake of oxygen gas and exhalation of ethylene gas.

Further the film of the present invention provides good transparency and gloss together with high mechanical properties (such as stiffness). Furthermore the breathing film of the present invention brings high productivity and profitability as it can omit the perforation process in the course of packaging procedure.

Accordingly the breathing film of the present invention can be widely used for the packaging of fresh produce.

TABLE 1

|  | Example 1 | Example 2 | Example 3 | Example 4 | Comp. Ex. 1 | Comp. Ex. 2 | Unit |
| --- | --- | --- | --- | --- | --- | --- | --- |
| Film structure |  |  |  |  |  |  |  |
| Substrate layer | Composition 1 | Composition 1 | Composition 1 | Composition 1 | Composition 2 | Composition 2 |  |
| Surface layer | Composition 4 | Composition 5 | Composition 6 | Composition 7 | Composition 2 | Composition 3 |  |
| Haze | 3.5 | 3.7 | 7.8 | 8.1 | 0.5 | 3.5 | % |
| Gloss | 110 | 107 | 75 | 72 | 135 | 110 | % |
| Young's modulus MD | 870 | 850 | 850 | 840 | 2000 | 1950 | Mpa |
| Water vapor permeability | 27.5 | 26.0 | 28.0 | 27.5 | 7.5 | 7.7 | g/m$^2$ · 24 hrs |
| Oxygen permeability | 4100 | 4000 | 4000 | 4000 | 600 | 610 | nmol/m$^2$ · s · 100 kPa |
| Ethylene gas permeability | 2800 | 2700 | 2900 | 2800 | 350 | 360 | nmol/m$^2$ · s · 100 kPa |

TABLE 2

|  |  |  | Example 1 | Example 2 | Example 3 | Example 4 | Comp. Ex. 1 | Comp. Ex. 2 | Evaluation standard |
| --- | --- | --- | --- | --- | --- | --- | --- | --- | --- |
| Freshness | Days of storage | 1 | ○ | ○ | ○ | ○ | ○ | ○ | ○: good |
|  |  | 2 | ○ | ○ | ○ | ○ | Δ | ○ | Δ: slightly degraded |
|  |  | 3 | ○ | ○ | ○ | ○ | x | ○ | x: degraded |
|  |  | 4 | ○ | ○ | ○ | ○ |  | Δ |  |
|  |  | 5 | ○ | ○ | ○ | ○ |  | x |  |
|  |  | 7 | ○ | Δ | ○ | ○ |  |  |  |

TABLE 2-continued

|  | Example 1 | Example 2 | Example 3 | Example 4 | Comp. Ex. 1 | Comp. Ex. 2 | Evaluation standard |
|---|---|---|---|---|---|---|---|
| 14 | x | x | x | x | | | |

TABLE 3

|  |  |  | Example 1 | Example 2 | Example 3 | Example 4 | Comp. Ex. 1 | Comp. Ex. 2 | Evaluation standard |
|---|---|---|---|---|---|---|---|---|---|
| Freshness | Days of storage | 1 | ◯ | ◯ | ◯ | ◯ | ◯ | ◯ | ◯: good |
|  |  | 2 | ◯ | ◯ | ◯ | ◯ | Δ | ◯ | Δ: slightly degraded |
|  |  | 3 | ◯ | ◯ | ◯ | ◯ | x | ◯ | x: degraded |
|  |  | 4 | ◯ | ◯ | ◯ | ◯ |  | Δ |  |
|  |  | 5 | ◯ | ◯ | ◯ | ◯ |  | x |  |
|  |  | 7 | ◯ | Δ | Δ | Δ |  |  |  |
|  |  | 14 | x | x | x | x |  |  |  |

What is claimed is:

1. A breathing film which contains at least one layer obtained by processing a propylene resin composition comprising crystalline propylene polymer(A) and propylene/α-olefin random copolymer(B) having 45 to 85% by weight of propylene unit based on the weight of copolymer(B); said film having thickness of 10 to 100 μm and having anti-bacterial agent coated thereon or included therein; in which said composition comprises 10 to 60% by weight of propylene/α-olefin random copolymer(B) based on the total weight of polymer(A) and copolymer(B) and the ratio $[\eta]_B/[\eta]_A$ of intrinsic viscosity $[\eta]_B$ of propylene/α-olefin random copolymer(B) and intrinsic viscosity $[\eta]_A$ of crystalline propylene polymer(A) being 0.3 to 1.2; and (1)water vapor permeability[$T_{H2O}$] (according to JIS Z-0208), (2)oxygen gas permeability [$T_{O2}\mu$] (according to JIS K-7126-A, and (3) ethylene gas permeability [$T_{ethylene}$] (according to JIS K-7126-A) are each in the range described below.

(1) [$T_{H2O}$]=9 to 50 (unit:g/m$^2$·24 h)

(2) [$T_{O2}$]=600 to 12500 (unit:nmol/m$^2$·s·100 kPa)

(3) [$T_{ethylene}$]=600 to 22500 (unit:nmol/m$^2$·s·100 kPa).

2. A breathing film described in claim 1 in which the crystalline propylene polymer(A) is a propylene/α-olefin random copolymer containing 99.1 to 99.9% by weight of propylene unit based on the weight of the copolymer.

3. A breathing film described in claim 1 in which the propylene/α-olefin random copolymer(B) has an intrinsic viscosity $[\eta]_B$ of 0.5 to 2.0 dL/g.

4. A breathing film described in claim 1 in which propylene/α-olefin random copolymer(B) is contained in the propylene resin composition in the range of 15 to 50% by weight based on the total weight of polymer(A) and copolymer(B).

5. A breathing film described in claim 1 in which propylene/α-olefin random copolymer(B) contains 20° C. xylene-soluble component equal to or more than 80% by weight based on the weight of copolymer(B).

6. A breathing film described in claim 1 which is a drawn film stretched in at least one direction at the draw ratio of 3 to 60 times.

7. A breathing film described in claim 1 which is a single layer film having the anti-bacterial agent coated thereon in the range of 0.01 to 300 mg per m$^2$ of the film or included therein in the range of 0.05 to 30% by weight based on the weight of the film.

8. A breathing film described in claim 1 which is a multi-layer film having the anti-bacterial agent coated on at least the surface layer in the range of 0.01 to 300 mg per m$^2$ of the surface layer or included in at least the surface layer in the range of 0.05 to 30% by weight based on the weight of the surface layer.

9. A breathing film described in claim 1 in which the anti-bacterial agent is at least one selected from the group of anti-bacterial zeolite, far infrared radiating ceramics, chitosan, hinokitiol and catechin, wherein the anti-bacterial agent passes 100 mesh sieve equal to or more than 80% by weight based on the weight of said anti-bacterial agent measured according to JIS Z-8801.

* * * * *